Figure 1:
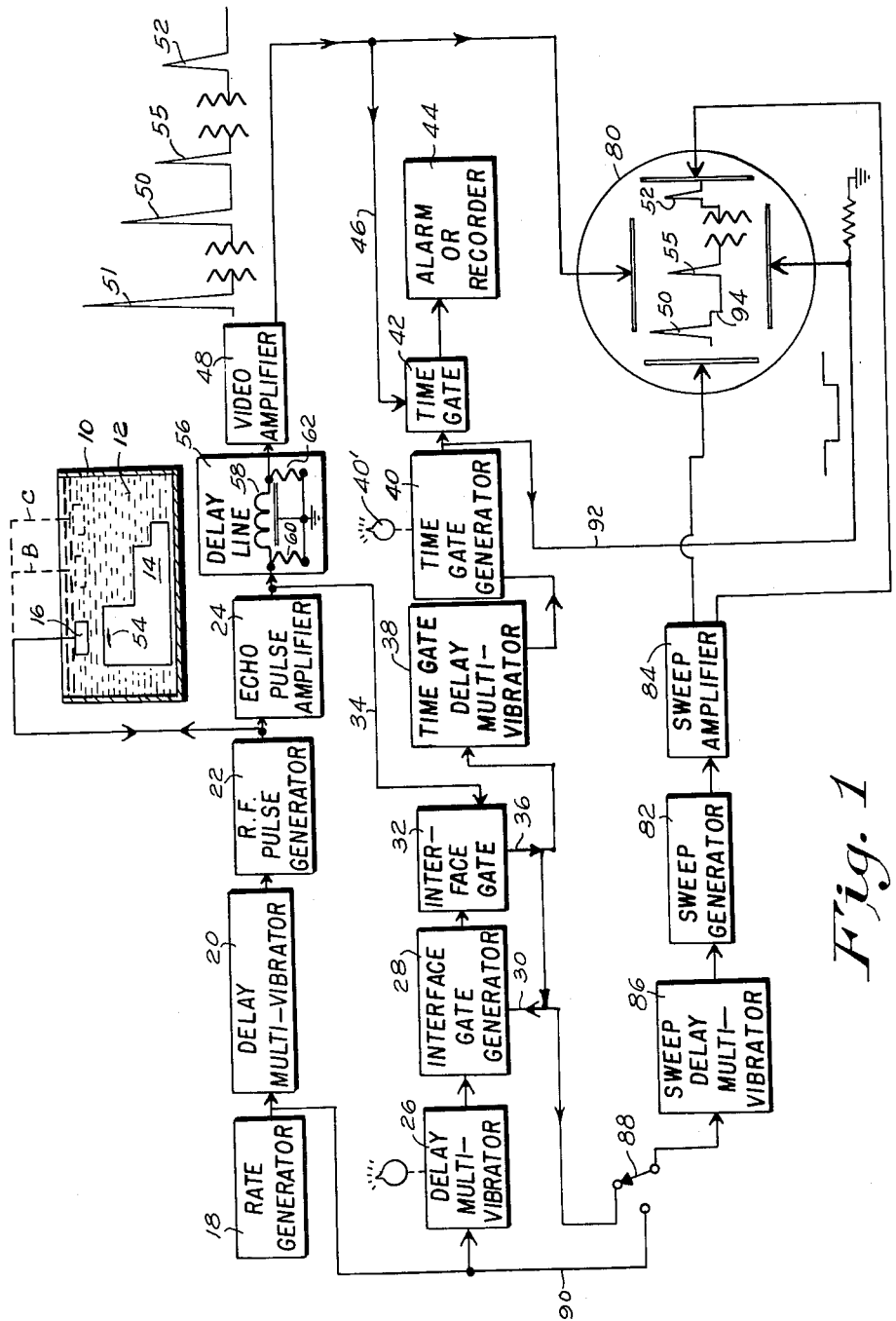

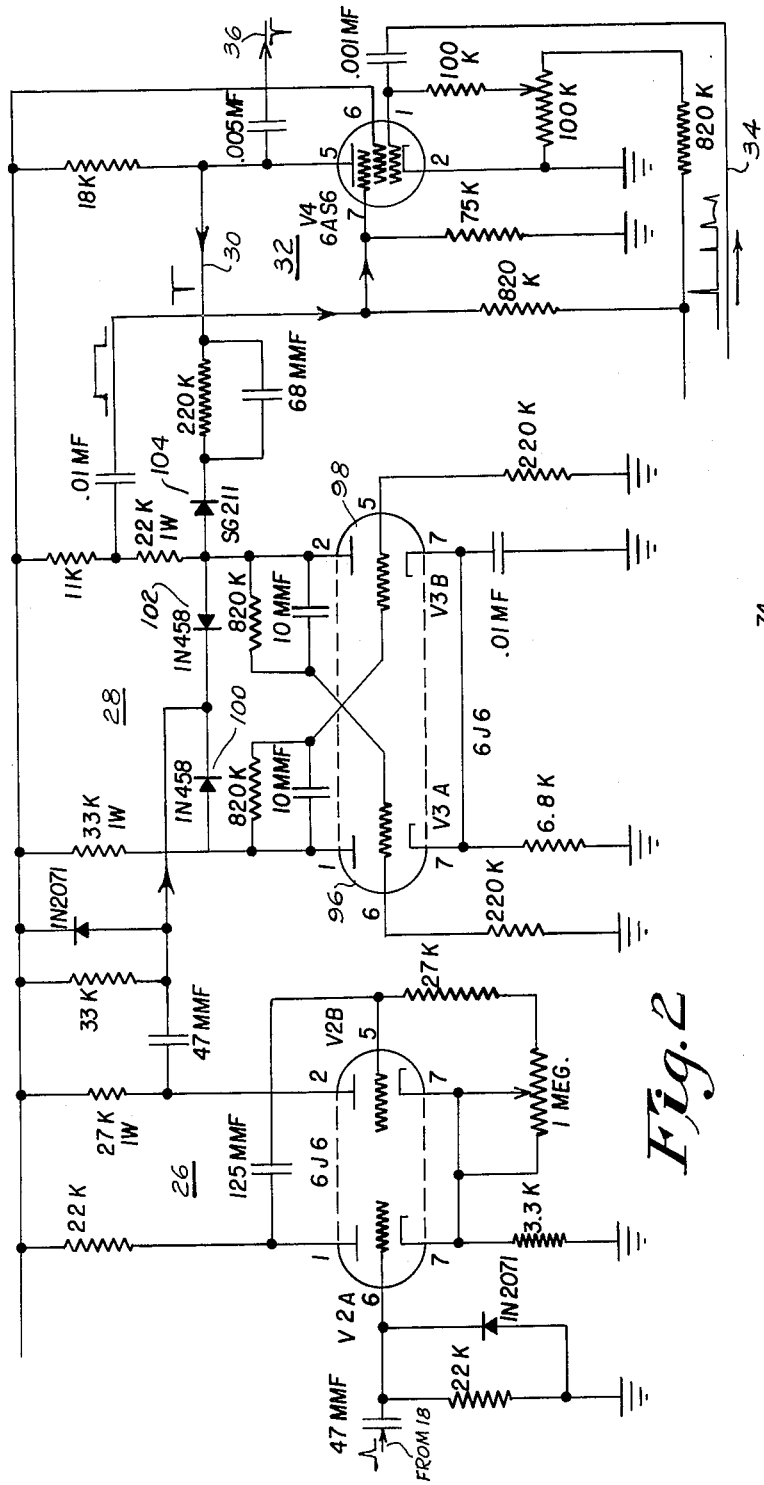
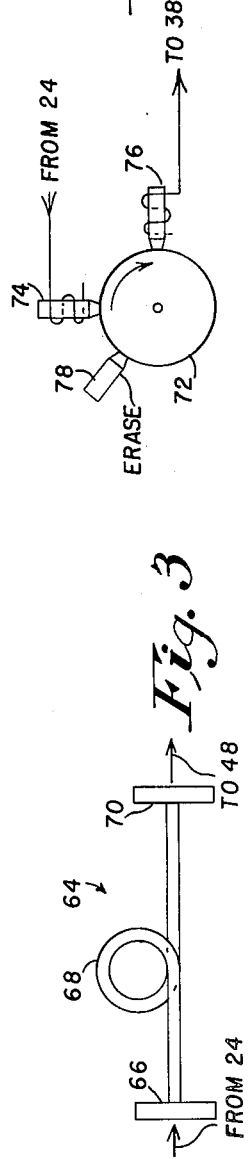
Fig. 2
Fig. 3
Fig. 4

United States Patent Office 3,262,306
Patented July 26, 1966

3,262,306
ULTRASONIC TESTING SYSTEM
Elliott A. Henry, Newtown, Conn., assignor, by mesne assignments, to Branson Instruments, Incorporated, Stamford, Conn., a corporation of Delaware
Filed Sept. 19, 1962, Ser. No. 224,713
5 Claims. (Cl. 73—67.9)

This invention pertains to systems for the inspection or testing of materials by ultrasonic compressional wave echo-ranging techniques. The main object of the invention is to improve and simplify such systems with respect to their ability to segregate or "select" only those echoes corresponding to defects or discontinuities lying actually within the test specimen boundaries.

Known material testing systems of the kind with which the invention is concerned utilize a transducer which is coupled to one face of a test specimen for propagating the probing energy pulse into the specimen, and the same or another transducer for responding to the energy reflected from (or otherwise modified by) any structural discontinuities in the total path. Such discontinuities may include not only defects or inhomogeneities within the test specimen, which may represent structural defects, but also the discontinuities representing the interfaces between the specimen boundaries and the couplant liquid. Signals or responses of the latter category do not represent defects, and should be suppressed or ignored for test purposes.

One prior system for effecting such supression of non-significant responses is represented by my prior patent U.S. 2,883,860 of April 28, 1959; the present invention constitutes an improvement thereof. In the system of that patent, the echo-response channel was in effect de-activated until after the occurrence of the first echo response, corresponding to the entry interface, so that only signals occurring thereafter were registered. A drawback of that system is that the inherent delays of the control channel which sensed the first response, and thereupon activated the indicating channel, also caused the suppression of signals due to defects lying just inside the entry face. It has been proposed to avoid this drawback by the use of a complete auxiliary control channel using a separate entry-face sensing transducer to provide an "anticipating" action that would turn on the indicating channel precisely as the main search pulse entered the specimen. This proposal requires expensive duplication of equipment, and is difficult to apply because the auxiliary transducer cannot be easily focused at the identical boundary point that is probed by the main transducer. This is especially true where the system is being employed to scan progressively different regions of an irregularly-shaped test specimen.

The present improvement solves the foregoing problems by a basically different approach. Instead of attempting to establish an early "anticipating" type of control by separate sensing of the entry face position, with the difficulties already discussed, the invention uses the first response signal (from the entry interface) as the control signal, but also introduces a calibrated delay in the main indicating or defect-registering channel. This allows a sufficient time for the control channel to operate without the unintended loss of any echoes occurring just inside the test specimen. It also eliminates the need for accurate knowledge or close physical control of the spacing between the transducer and the entry point at the specimen. Moreover, it enables the operator to preserve the entire signal train, including interface signals, if desired, for display during initial alignment or adjusting operations.

A preferred embodiment of the invention, given by way of explanation and not for purposes of limitation, will now be described in detail, reference being made to the accompanying drawings, in which:

FIG. 1 is a complete block diagram of the system.
FIG. 2 is a schematic diagram of a portion of FIG. 1.
FIG. 3 is a diagram of a portion of FIG. 1 showing a modified form of signal trains delaying reproducer.
FIG. 4 is a similar diagram showing still another delaying reproducer.

Referring first to FIG. 1, numeral 10 designates the usual tank of an ultrasonic inspection apparatus, containing a body of energy-couplant liquid 12 with the test specimen 14 inmersed therein. The pulse transducer 16 is also immersed in the couplant liquid, and may for example be of a combined transmitting and receiving type familiar to those skilled in the art. Alternate or progressive positions of the transducer 16 are indicated in dash lines, and where the test specimen 14 has an irregular entry face, it will be noted that the travel time between the transducer and the entry face of the specimen may vary in essentially a random fashion.

The system "clock" is represented by the rate generator 18, which may for example be an astable free-running multivibrator, producing timing pulses at a selected rate, usually in the range of from 100 to 1,000 per second, depending upon the requirements imposed principally by the size of the test specimen. Pulses or trigger signals from the rate generator are applied to the delay multi-vibrator 20, a monostable multivibrator, which produces a properly shaped and delayed pulse to activate the ultrasonic ("R.F.") generator 22 for the desired pulse interval, commencing after a delay interval (following the clock pulse) sufficient to allow certain other components to operate before the main "bang" or ultrasonic probing pulse is applied to the test specimen.

The ultrasonic pulse generator 22 is typically a triggered discharge device such as a four-layer diode, or a thyratron or gas filled tube such as disclosed in my Patent No. 3,038,328, issued to the assignee of this application on June 12, 1962. It produces, when activated by multivibrator 20, a burst or group of ultrasonic frequency waves or cycles of suitable amplitude to energize transducer 16 and thereby cause a corresponding ultrasonic compressional wave to be propagated through couplant 12 and into the specimen or workpice 14. Echo pulses from specimen interfaces and discontinuities are received at transducer 16 and applied to a conventional echo pulse amplifier 24. It is the removal or exclusion from this mixed signal output,for defect-testing purposes, of the entry interface reflection signal, which is the main purpose of the present invention; this operation will hereinafter be referred to for brevity as interface gating.

In a manner similar to that described in the first patent mentioned above, the clock or rate generator 18 also applies a pulse to the monostable delay multivibrator 26 whose function is to supply an output trigger an adjustable time following the clock pulse from generator 18 but prior to the instant at which the entry interface echo signal returns to transducer 16 from the specimen 14. The The adjustability of this delay (at 26) permits the system to accommodate various spacings of the transducer and the test specimen, and allows effectively the entire display or registration interval of the equipment to be devoted to events which occur within the specimen, rather than merely within the complete propagation interval inside the tank.

The delayed trigger from multivibrator 26 is applied to the interface gate generator 28, preferably a bistable multivibrator arranged to receive a "turn on" signal from 26, and to receive a separate "turn-off" signal over conductor 30, for a purpose to be described below. The gate signal (a rectangular pulse) from gate generator 28 is applied as the control or turn-on signal of a gate amplifier 32 whose signal input is derived over conductor 34 from the output of echo pulse amplifier 24 already described. Hence, the interface gate amplifier 32 provides an output signal at 36 only during the gate or "on" interval initiated by delay multivibrator 26 and gate generator 28. The interface gate 32 remains "on" (open or sensitized) and will therefore pass the first echo signal which will be the undelayed echo signal from pulse amplifier 24. This is equivalent to a coincidence or "and" circuit operation, since output from gate amplifier 32 depends upon the presence of two input signals of proper amplitude and polarity, one being the echo pulse from echo amplifier 24. However, the signal output from gate 32 due to the interface signal is coupled to the interface gate generator at 30, thus restoring the generator to its "off" condition and closing gate 32 so that no subsequent echo signals from pulse amplifier 24 will be transmitted through said gate 32 until a subsequent probe pulse has been initiated by rate generator 18.

The output of gate amplifier 32 at 36 is also applied to the time gate delay multivibrator 38 which, after a calibrated interval, turns on the time gate generator 40 which is a monostable multivibrator whose quasi-stable period determines the over-all time gate duration. The output of generator 40 is applied to a time gate coincidence circuit 42, similar in operation to gate amplifier 32, in that an output signal to the defect-registering alarm or recorder 44 is permitted only when the time gate 42 is "on," and when an echo signal is also being received over conductor 46 from echo ("Video") amplifier 48. By adjusting the quasi-stable period of gate generator 40 (at 40'), the remote boundary echo signal 52 can thus be excluded from the visual or aural alarm or recording channel at 44. As already described, the "near" interface echo signal 50 and of course the probing pulse 51 are excluded from that channel by reason of the fact that gate 42 is normally "off" until turned on by the output of gate 32 following the first interface echo as described.

While the delay multivibrator 26 has been described as having an adjustable delay time, it is obvious that as a practical matter both it and the circuits and components following (which it controls) will have a certain minimum reaction time which cannot be infinitely small. Hence, without more, the system as described would suppress echo signals due to defects, such as indicated at 54 in specimen 14, lying very near the entrance interface. The invention overcomes this by providing a small purposeful delay in the signal channel from echo pulse amplifier 24 to the time gate 42. This delay need only be sufficient to ensure that gate 42 can be opened or turned "on" by generator 40 before the arrival at the gate of such early echo pulses, which would otherwise be excluded. To this end, the echo signal output from amplifier 24 is applied to the signal delay device 56 shown as a conventional electrical delay line 58 suitably terminated by resistors 60, 62 equal to its characteristic impedance so as to eliminate internal reflections.

Delay device 56 should be such as to faithfully transmit the entire echo signal train without relative timing distortions, but otherwise may be chosen from various known devices of this type. For example, and as shown in FIG. 3, an acoustically coupled delay device 64 may be substituted for the electrical delay line device 56. Such acoustic delay devices are well known per se, and may include an input transducer 66, producing a pressure wave in a tube or solid propagation medium 68 having an output transducer 70 at its remote end.

Another form of delay device is illustrated in FIG. 4, comprising a short-time magnetic record-reproducer having a constantly rotating magnetizable disc 72 with a recording head 74 spaced ahead of a reproducing head 76, with provision 78 for continuous magnetic erasure ahead of the recording head 74.

From the system viewpoint, it is immaterial how the signal delay is introduced, the choice depending upon system parameters, cost, environmental conditions and the like. In any event, the delayed signal will normally be brought to a suitable output level by the signal ("Video") amplifier 48 before it is applied to the output device 44.

Returning to FIG. 1, provisions will be described for providing a visual display of the echo signals, both for facilitating initial adjustments and for human monitoring or supervision of the tests when desired. Typically, a cathode-ray tube indicator 80 will be employed. Since the construction of oscilloscopes of this kind is well known, it is sufficient to represent the same by its screen and schematic deflection plates. The horizontal deflection plates are energized from a conventional saw-tooth sweep generator 82 and amplifier 84.

The commencement of each timing or display sweep of the cathode ray indicator tube is controlled by the sweep delay multivibrator 86, and a two-position switch 88 allows the latter to be triggered from two different sources. In the switch position illustrated in FIG. 1, the sweep delay multivibrator is triggered by the same output from the interface gate 32 which served to trigger the time gate delay multivibrator 38 as described above; this is the output from gate 32 indicated at numeral 36. The same output, as already described, operated to turn "off" the gate generator 28. With this position, then, the sweep of oscilloscope 80 may or may not commence before the occurrence of the near interface reflection pulse 50, and thus the pulse may or may not be displayed on the trace, depending on the adjustment of delay 86. The first pulse displayed on the scope might be the interface echo 50 or a pulse 55 corresponding to a reflection from the defect 54 in the specimen 14. A later echo pulse would represent a reflection from some defect lying deeper within the specimen, while (as already described) the last pulse 52 displayed on the screen of 80 might correspond to the reflection from the farthest interface of the test specimen.

With switch 88 in its other position (not shown), the sweep generator 82 will commence its sweeping action under the control of rate generator 18 via the connection 90, allowing the operator to monitor on scope 80 the entire sequence of events commencing at least with the initial interface reflection pulse 50. This is of value in that it enables the operator to observe the amplitude of the early interface signal for amplifier gain adjustments, and also allows him to adjust the gate generator 40 so as to ensure that deflections from defects lying very close to the far surface will in fact be transmitted to the alarm or recording channel 44.

A connection 92 from the output of time gate generator 40 to the lower one of the vertical deflection plates of oscilloscope 80 provides a downward vertical step indicated at 94 in the base line of the oscilloscope trace. The length of this step in the direction of the time axis will represent precisely that interval within which defect signals are gated out to the alarm or recorder channel 44. Hence, the operator will be able to adjust the delay multivibrator 26 very precisely to exclude the early interface echo without excluding any significant echoes from shallow defects in the specimen.

If the transducer 16 is moved or scanned along the specimen 14, for example, to the positions indicated in dash lines at B or C, the travel time of the probing pulse in the coupling liquid will be vastly different. Nevertheless, with the system as described, the near interface echo is properly suppressed without also suppressing significant reflections from within the test specimen.

FIG. 2 of the drawings illustrates schematically how the interface gate generator 28 and the interface gate amplifier 32 are interconnected. As mentioned above, the interface gate generator 28 is a two-stage flip-flop (bistable multivibrator) whose stages 96 and 98 are independently controlled by delay multivibrator 26 and by the output of interface gate 32. In FIG. 2, typical values of components are given for the monostable delay multivibrator 26, the bistable multivibrator (interface gate generator) 28 and the interface gate amplifier 32, in the interest of a complete disclosure, but these values are not to be taken as limiting the invention. Since the manner in which the multivibrator 28 is controlled (flipped and flopped) differs from the conventional arrangement, the related parts will be described in more detail.

Typically, a bistable multivibrator is arranged to be "flipped" (one stage made conducting) by a turn-on trigger applied to that stage, and to be "flopped" (the other stage made conducting) by a turn-off trigger applied to the opposite stage. In the present application, the use of a bistable multivibrator as the interface gate generator is desirable because of the random length of time the gate may be required to be "open," but if the initiating trigger were to be injected into one side or stage of the multivibrator, and the shut-off or terminating trigger were injected into the other side or stage, then the device would jam or lock-out each time that a shut-off trigger failed to arrive. That is, the multivibrator 28 would remain flipped at the time of arrival of the succeeding turn-on pulse from the rate generator 18, which pulse would therefore be incapable of changing the state of the multivibrator.

The arrangement of FIG. 2 overcomes this difficulty, the turn-on pulse from delay multivibrator 26 being coupled to both stages of the bistable multivibrator 28, via the respective disconnect diodes 100 and 102. The turn-off pulse from gate 32 is applied over conductor 30 through the diode 104. It follows that whichever stage of multivibrator 28 is non-conducting at the time of arrival of the turn-on trigger will become conducting, and in the absence of one or more turn-off pulses from gate 32, the multivibrator 28 will be continuously flipped and flopped at the pulse rate established by the rate generator 18, and cannot be jammed for more than one sampling period.

In the description above, it has been assumed that the time gate 42 has been employed merely to gate out, from the alarm or recorder 44, echo signals corresponding to the entry interface and the remoter boundary of the test specimen. It will be apparent that additional time gates may be employed, set to transmit different portions of the sequence of echo signals. For example, by having one time gate set so as to pass only the entry interface echo signal itself, and arranged to give an alarm when the amplitude of this echo falls below a predetermined amplitude, a continuous monitor of the operation of the ultrasonic system as a whole will be obtained, even though the particular test specimen under inspection is sound and there are no defects within it. This will prevent the approval of specimens which may not be free from defects, if the system has become defective or maladjusted, and provide "fail-safe" operation. An additional time gate which is set to monitor the opposite-boundary echo can also be provided.

While the invention has been described above in considerable detail as to the preferred embodiment, it will be understood that such details are not intended in a limiting sense, and that the invention is intended to cover all modifications of the described arrangements which fall within the scope of the appended claims.

What is claimed is:

1. In ultrasonic testing apparatus of the kind including a response-signal registering device and (a) transducer means for applying successive short pulses of compressional-wave energy to a boundary surface of a test specimen and for generating response signals upon the return of echoes from such specimen, and including
(b) control circuitry responsive to the first such response signal from each of said pulses for performing a gate-opening function to allow transmission of the succeeding response signals to said registering device, said control circuitry having an unavoidable time delay tending to cause undesired suppression of early response signals from within the test specimen, and
(c) normally-closed gating means responsive to said control circuitry and connected in a signal path between said transducer means and said registering device,
(d) the improvement which comprises signal path delay means connected in said signal path between said transducer means and said gating means for transmitting the train of echo signals to said registering device after a delay period at least equal to said unavoidable time delay of said control circuitry;
(e) whereby delay in the response of said control circuitry to said first response signal will not result in suppression from said registering device of closely-following echo signals from within said specimen.

2. Ultrasonic testing apparatus in accordance with claim 1, including an amplifier connected between said transducer means and said control circuitry; said signal path delay means being connected between the output of said amplifier and the signal transmission path through said gating means.

3. Ultrasonic testing apparatus in accordance with claim 1, including response signal display means comprising a cathode ray oscilloscope having a ray-deflection input connected to the output of said signal path delay means and a ray-sweeping input triggered by response signals from said transducer means.

4. Ultrasonic testing apparatus in accordance with claim 3, in which said means control circuitry includes a time gate generator for controlling the interval during which response signals are transmitted to said registering device; and a connection between the output of said time gate generator and said oscilloscope for offsetting the sweep trace base line thereof to provide a visual indication of the period during which response signals are transmitted to said registering device.

5. Ultrasonic testing apparatus in accordance with claim 3, including a rate generator for controlling the energization of said transducer means, and switch means for selectively connecting said ray-sweeping input for direct control by said rate generator or for control via the control circuitry of said gating means.

References Cited by the Examiner

UNITED STATES PATENTS

| 2,646,555 | 7/1953 | Straehl | 73—67.9 X |
| 2,883,860 | 4/1959 | Henry | 73—67.9 |
| 3,132,510 | 5/1964 | Buchan et al. | 73—67.9 X |
| 3,164,007 | 1/1965 | Stebbins et al. | 73—67.9 |

RICHARD C. QUEISSER, *Primary Examiner.*

JOHN P. BEAUCHAMP, *Examiner.*

J. J. GILL, *Assistant Examiner.*